(12) United States Patent
Bottomley et al.

(10) Patent No.: US 7,212,591 B2
(45) Date of Patent: May 1, 2007

(54) METHODS AND RECEIVERS THAT ESTIMATE MULTI-PATH DELAYS BY REMOVING SIGNAL RAYS FROM A POWER-DELAY PROFILE

(75) Inventors: Gregory Edward Bottomley, Cary, NC (US); Ali S. Khayrallah, Cary, NC (US); Henrik Olson, Spanga (SE); Johan Nilsson, Hollviken (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 814 days.

(21) Appl. No.: 10/424,958

(22) Filed: Apr. 28, 2003

(65) Prior Publication Data

US 2004/0213363 A1 Oct. 28, 2004

(51) Int. Cl.
*H03D 1/00* (2006.01)

(52) U.S. Cl. ............... 375/343; 375/152; 375/150; 375/147; 375/148; 370/328; 370/252; 370/342

(58) Field of Classification Search ............... 375/147, 375/286, 316, 354
See application file for complete search history.

(56) References Cited

U.S. PATENT DOCUMENTS

| 5,615,232 | A | 3/1997 | Van Nee ............. 375/346 |
| 6,229,842 | B1 | 5/2001 | Schulist et al. |
| 6,363,104 | B1 | 3/2002 | Bottomley ........... 375/148 |
| 6,510,143 | B1* | 1/2003 | Bejjani et al. ......... 370/320 |
| 6,731,622 | B1* | 5/2004 | Frank et al. .......... 370/342 |
| 6,912,243 | B1* | 6/2005 | Ishioka ............... 375/147 |
| 6,996,157 | B2* | 2/2006 | Ohsuge .............. 375/148 |
| 7,075,974 | B2* | 7/2006 | Ohsuge .............. 375/152 |
| 2002/0106039 | A1 | 8/2002 | Sugita |
| 2003/0103555 | A1* | 6/2003 | Han et al. ............ 375/147 |
| 2003/0228887 | A1* | 12/2003 | Kishigami et al. ....... 455/561 |

FOREIGN PATENT DOCUMENTS

EP 0 654 677 5/1995

(Continued)

OTHER PUBLICATIONS

Sourour et al., "Delay tracing for direct sequence spread spectrum systems in multipath fading channels," Vehicular Technology Conference, 1999 IEEE, Houston, TX, May 1999, pp. 422-426.

(Continued)

*Primary Examiner*—Chieh M. Fan
*Assistant Examiner*—Siu M. Lee
(74) *Attorney, Agent, or Firm*—Michael G. Cameron, Esq.

(57) ABSTRACT

A method for estimating a plurality of delay values in a multi-path communication signal. Correlation values are generated that correspond to a plurality of delay values associated with the multi-path communication signal. A first power-delay profile (PDP) sequence is produced from the correlation values and is used to estimate a first delay value. A first reference PDP sequence is generated based on a predefined PDP sequence and the first PDP sequence. The first reference PDP sequence is removed from the first PDP sequence so as to remove at least a portion of the contributions to the first PDP sequence from the first delay value, and to provide a second PDP sequence. A second value is estimated based on the second PDP sequence.

6 Claims, 4 Drawing Sheets

FOREIGN PATENT DOCUMENTS

| | | |
|---|---|---|
| EP | 0 701 343 | 3/1996 |
| EP | 1 126 626 | 8/2001 |
| WO | WO 99/35763 | 7/1999 |
| WO | WO 02/43266 | 5/2002 |

OTHER PUBLICATIONS

Invitation to Pay Additional Fees, Annex to Form PCT/ISA/206, Communication Relating to the Results of the Partial International Search, PCT/US04/12733, Sep. 17, 2004.

* cited by examiner

METHODS AND RECEIVERS THAT ESTIMATE MULTI-PATH DELAYS BY REMOVING SIGNAL RAYS FROM A POWER-DELAY PROFILE

FIELD OF THE INVENTION

This invention relates to wireless communication receivers, and more particularly to methods and receivers that estimate signal delays in multi-path communication channels.

BACKGROUND OF THE INVENTION

Some wireless digital communication systems use frequency division multiple access (FDMA) to divide the RF communication spectrum into a plurality of radio channels corresponding to different carrier frequencies. Some wireless communication systems divide the same carrier frequency into a periodic train of time slots that are separately used by RF transmitters, referred to as time-division-multiple-access (TDMA). Example TDMA digital cellular systems include IS-136, GSM (Global System for Mobile Communications), EDGE (Enhanced Data rates for GSM Evolution), and PDC (Personal Digital Cellular).

Still some other wireless communication systems use code division multiple access (CDMA) to allow different signals to share the same carrier frequencies. Example CDMA cellular systems include IS-95, cdma2000, and WCDMA (wideband-CDMA). In a CDMA system, an information data stream to be transmitted is impressed upon a higher rate data stream, known as a spreading sequence, to provide a stream of bits referred to as a chip sequence. A receiver then correlates a received chip sequence to the spreading sequence to recover the information data stream.

In RF communications systems, signals that are transmitted to a receiver typically suffer from distortion due to time dispersion, caused by, for example, signal reflections from buildings and other reflective terrestrial surfaces. Multi-path dispersion occurs when a signal proceeds to the receiver along not one but many paths so that the receiver receives many "images" having different and varying delays and amplitudes. Thus, when multi-path time dispersion is present, the receiver receives a composite signal of multiple versions of a transmitted bit that have propagated along different paths (referred to as "signal paths" or "rays"). Each signal path has a certain time of arrival relative to the arrival of a shortest, or first received, signal path. Receivers may collect the signal energy from the different multi-paths to reproduce the transmitted information.

A receiver may model the channel as a tapped delay line, in which tap locations correspond to ray or path delays and the tap coefficients correspond to channel coefficients. The delays and coefficients may be estimated and used to demodulate a received signal. For TDMA, or other narrow-band systems, a receiver may include a coherent demodulator, such as a decision feedback equalizer (DFE) or maximum likelihood sequence equalizer (MLSE). For CDMA systems, the demodulator may include a RAKE receiver.

A RAKE receiver may be used to detect individual signal images or versions using correlation operations, to correct for different time delays, and to combine the detected signal images. RAKE receivers include processing elements or "fingers". The receiver may estimate the delays of the multi-paths and assign a finger to each delay. The finger then despreads the signal image. The finger outputs may be combined by weighting them and adding them together.

Delay estimation may be challenging when the rays are closely spaced relative to the bit period in TDMA systems or the chip period in CDMA systems. Delays may be particularly difficult to estimate when the rays interact with one another, such as due to a ringing of pulses in a CDMA chip sequence, and/or when the delays occur within several bit/chip periods.

One approach to estimating delays in multi-path signals is discussed in the commonly assigned U.S. patent application Ser. No. 09/005,580, filed Jan. 12, 1998, entitled "METHOD AND APPARATUS FOR MULTI-PATH DELAY ESTIMATION IN DIRECT SEQUENCE SPREAD SPECTRUM COMMUNICATION SYSTEMS", which is incorporated herein by reference.

SUMMARY OF THE INVENTION

Embodiments of the present invention estimate delays that may be introduced into a communication signal by a multi-path communication channel. Correlation values are generated that correspond to a plurality of delay values associated with the multi-path communication signal. A first power-delay profile (PDP) sequence is produced from the correlation values and is used to estimate a first delay value. A first reference PDP sequence is generated based on a predefined PDP sequence and the first PDP sequence. The first reference PDP sequence is removed from the first PDP sequence to provide a second PDP sequence. By removing the first reference PDP sequence from the first PDP sequence, at least a portion of the contributions of the first delay value to the first PDP sequence are removed from the first PDP sequence. A second delay value is estimated based on the second PDP sequence.

Accordingly, when the PDP sequence is produced from a combination of multi-path signals, the effects of one signal path may be removed from the PDP sequence so that other signal path delays may be more accurately estimated.

DETAILED DESCRIPTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions.

The present invention is described below with reference to block diagrams and/or operational illustrations of methods and wireless receivers according to embodiments of the invention. It is understood that each block of the block diagrams and/or operational illustrations, and combinations of blocks in the block diagrams and/or operational illustrations, can be implemented by radio frequency, analog and/or digital hardware, and/or computer program instructions. These computer program instructions may be provided to a processor of a general purpose computer, special purpose computer, ASIC, and/or other programmable data processing apparatus in a wireless terminal or base station, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
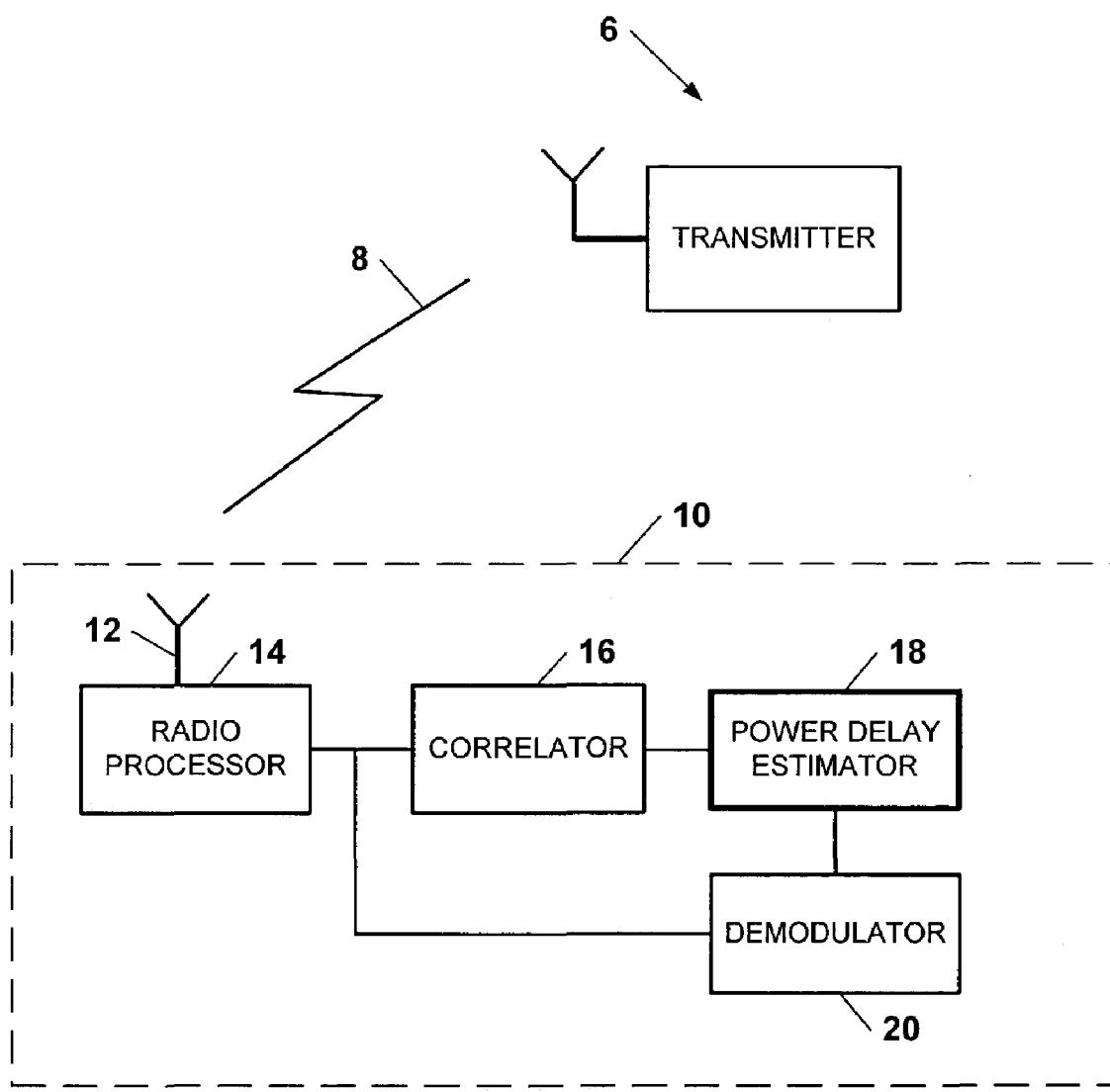
FIG. 1 illustrates a wireless receiver according to embodiments of the present invention.

FIG. 1 illustrates a wireless communication system that includes a transmitter 6 that transmits a radio communication signal through a wireless channel 8 to a receiver 10. The receiver 10 includes an antenna 12, a radio processor 14, a correlator 16, a power delay estimator 18, and a demodulator 20 according to some embodiments of the present invention. A radio signal is received by the antenna 12 and may be amplified, filtered, and converted to a baseband frequency by the radio processor 14. The baseband frequency signal may be sampled and quantized to produce digital data samples.

The correlator 16 correlates the data samples to a predefined sequence to generate complex (in-phase and quadrature) correlation values that correspond to delay values introduced into the received communication signal by multi-path effects of the wireless channel 8. For a CDMA wireless communication system, the correlator 16 may correlate the data samples to a predefined spreading sequence. The predefined spreading sequence may be the same spreading sequence that is used by the transmitter 6 to spread information signals. The correlator 16 may be single correlation device, a bank of correlation devices, or a sliding correlator (such as a matched filter). For a TDMA wireless communication system, the correlator 16 may correlate the data samples to a predefined training sequence. The correlator 16 passes the complex correlation values to the power delay estimator 18.

Figure 2:
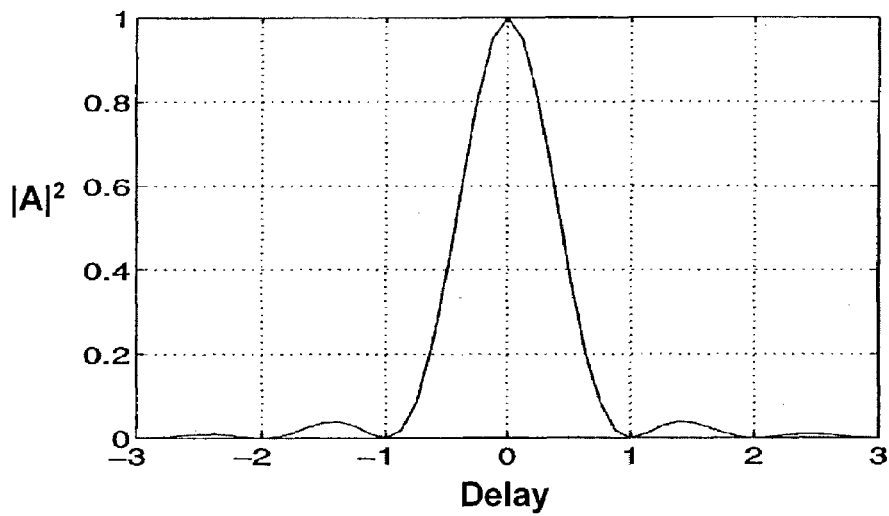
FIG. 2 illustrates a power-delay profile corresponding to a single path channel.

The power delay estimator 18 produces a power-delay profile (hereinafter "PDP") sequence from the complex correlation values. The PDP sequence may be produced by squaring and adding the in-phase (I) and quadrature (Q) components of the complex correlation values. As will be appreciated by one who is skilled in the art, the PDP sequence may by generated by any conversion of complex correlation values to a real number representation. When the communication system uses a root-raised cosine filter with a rolloff of 0.22, such as that used in WCDMA systems, the resulting PDP sequence for a single path wireless channel is illustrated in FIG. 2. As illustrated, the filter causes the path image to be spread out in a main-lobe and side-lobes due to the communication system using band-limited signals. The location of the peak, or maximum value, of the PDP sequence may be used as an estimate of the delay that has been introduced into the communication signal by the wireless channel 8. As shown in FIG. 2, the peak of the PDP sequence occurs at zero, which may correspond to zero path delay (i.e., only one image of the communication signal). If noise were present in the received signal, the PDP sequence may be shifted upward in power by a noise value (the noise floor).

However, communication signals generally travel through multiple signal paths in a communication channel, and when the signal paths are closely spaced, it may be difficult to distinguish the peaks of the individual signal paths in the received signal. The use of signal shaping filters in a transmitter and/or receiver can further blur the combined signals and complicate the finding of individual signal peak values. As a result, the apparent location of the peaks in a combined received signal may not accurately indicate the actual peak locations of the individual signal paths.

Figure 3:
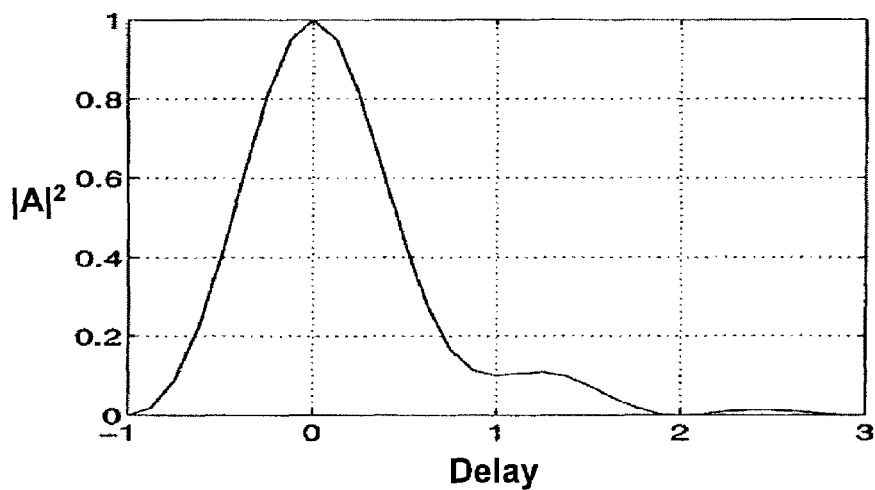
FIG. 3 illustrates a power-delay profile corresponding to a dual path channel.

FIG. 3 illustrates an example PDP sequence that includes two rays, located at delays 0 and 1. The first ray has a complex coefficient of 1 with a phase of 90 degrees. The second ray has a complex coefficient that is 10 dB lower than the first ray and has a phase of 180 degrees. It is also assumed that the rays have been shaped by a root-raised-cosine filter with a rolloff of 0.22 in the transmitter 6 and/or the radio processor 14, such as what may be used in a WCDMA communication system. As illustrated in FIG. 3, a side-lobe of the first ray distorts the location of the second ray. Consequently, if peak detection were used to estimate path delays, the delay of the first signal ray may would be correctly indicated by the peak at 0, however, the delay of the second ray would be incorrectly indicated by a peak at 1.25, instead of at 1. Distortion of estimates of signal path delays can become particularly significant as the number of rays increases, the spacing between them decreases, and/or the difference between their peak values decreases.

Figure 4:
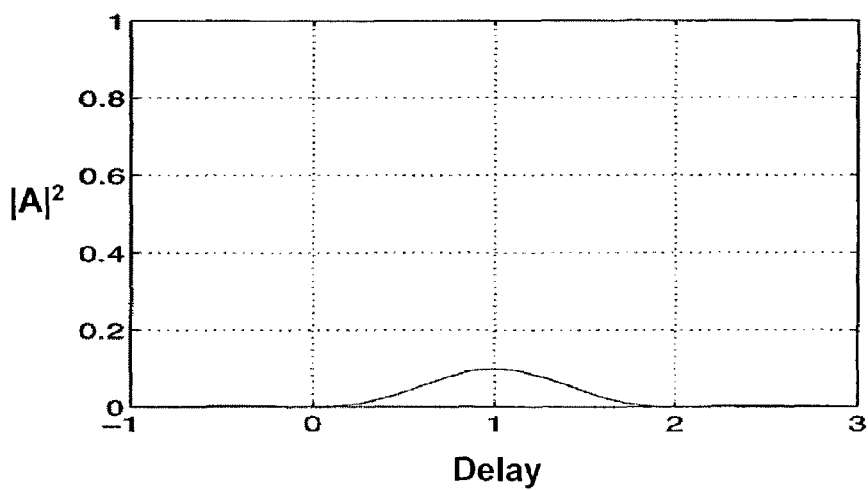
FIG. 4 illustrates a power-delay profile corresponding to a second signal image after removal of the power-delay profile of FIG. 2 from the dual path channel of FIG. 3, according to embodiments of the present invention.

The power delay estimator 18 removes at least some of the effects of multi-path interference in the PDP sequence to produce improved estimates of the multi-path delays. With reference to the example two path PDP sequence that is illustrated in FIG. 3, the power delay estimator 18 determines a signal power level value from the PDP sequence (i.e., 1). The power delay estimator 18 then scales a predefined PDP sequence using the signal power level value to provide a reference PDP sequence. For example, the signal power level value may be determined by subtracting a noise power level from the peak of the PDP sequence. The predefined PDP sequence may be an estimate of a PDP sequence for a single path channel, such as that illustrated in FIG. 2. The power delay estimator 18 then removes the reference PDP sequence from the two path PDP sequence (i.e., FIG. 3), to produce a modified PDP sequence, as illustrated in FIG. 4. The modified PDP sequence illustrated in FIG. 4 corresponds to the signal that is received from the second signal path in the communication channel 8, and, as illustrated, its peak accurately occurs at a delay of 1.

Accordingly, when the PDP sequence is formed from a combination of multi-path signals, the effects of a first signal path may be removed from the PDP sequence so that other signal path delays may be more accurately estimated.

The demodulator 20 may use the estimates of the multi-path delays and/or the PDP sequences from the power delay estimator 18 to collect signal energy from received multi-path signals and to demodulate the received information. For a TDMA system, the demodulator 20 may provide coherent or non-coherent demodulation of the received signal, such as by a decision feedback equalization (DFE) process or a maximum likelihood sequence equalization (MLSE) process. For a CDMA system, the demodulator 20 may include a RAKE receiver with correlators or "fingers" that may be positioned according to the delay estimates, and used to despread channel signals. Rake receivers are discussed in U.S. patent application Ser. No. 09/344,899, filed Jun. 25, 1999, entitled "RAKE COMBINING METHODS AND APPARATUS USING WEIGHTING FACTORS DERIVED FROM KNOWLEDGE OF SPREADING SPECTRUM SIGNAL CHARACTERISTICS", and in U.S. Pat. No. 6,363,104, both of which are incorporated herein by reference.

Figure 5A:
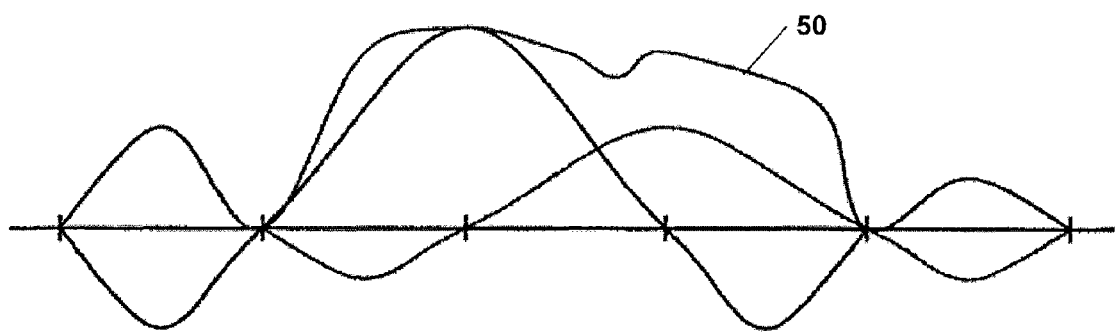
FIGS. 5a–c illustrate a power-delay profile corresponding to another dual path channel, a power-delay profile corresponding to a first signal image, and a power-delay profile corresponding to a second signal image after removal of the first signal image, according to embodiments of the present invention.

Other embodiments of the present invention are discussed with reference to FIGS. 5a–c, which illustrate sequences for a two signal path channel and the combined PDP sequence of a received signal, and with reference to FIG. 6, which illustrates operations for estimating delays in a multi-path channel. At Block 600, noise in the communication channel is measured to form a channel noise level. The noise level may be measured during gaps between received information signals, or by conventional processes that are well known in the art. Complex correlation values are generated at Block 602, using, for example, conventional correlation processes that are well known in the art.

At Block 604, an original PDP sequence 50 (FIG. 5a) is produced for a sequence of sample delay times by determining the magnitude-squared of the complex correlation values of the received signal. As illustrated in FIG. 5a, the PDP sequence 50 has contributions from a first signal ray and a second signal ray.

A peak power level value in the PDP sequence 50 (FIG. 5a), and the delay location of the peak power level value, are determined at Block 606. The location of the peak power level value corresponds to a delay estimate for one of the signal paths in the communication channel.

At Block 608, a determination is made as to whether a stopping criteria has been satisfied. When the stopping criteria has been satisfied, the operations may stop. Otherwise, when the stopping criteria has not been satisfied, the operations may continue through Blocks 610–614 before looping back to Block 606. The stopping criteria of Block 608 may include determining when a selected number of signal rays have been removed from a PDP sequence, and/or when the power level value (Block 606) satisfies (e.g., is greater than) a threshold value. The threshold value may correspond to a minimum threshold above the channel noise level (Block 600), or above an estimated noise level that is associated with a communication channel.

Alternatively, the determination at Block 608 of whether the power level value (Block 606) satisfies a threshold value, may be preformed earlier in the sequence of operations, and may, for example, be performed anytime after the power level value is determined at Block 606. The delay estimation process may then stop once the threshold value is satisfied.

Noise in the communication channel may bias upward the amplitudes of the PDP sequences. By removing the channel noise power level, the PDP sequences may more accurately represent the combined effects of the multi-path signal paths in the communication channel. Accordingly, at Block 610, the channel noise level (Block 600) is removed (e.g., subtracted) from the peak power level value (Block 606) to produce a modified power level value. Alternatively, at Block 604 the channel noise level (Block 600) may be to removed from the PDP sequence.

Figure 5B:
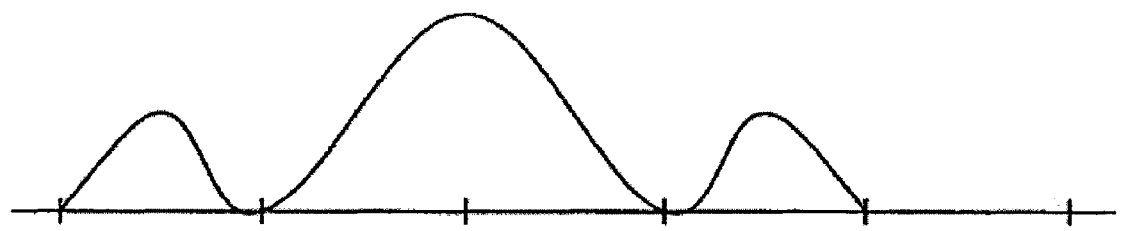
Figure 6:
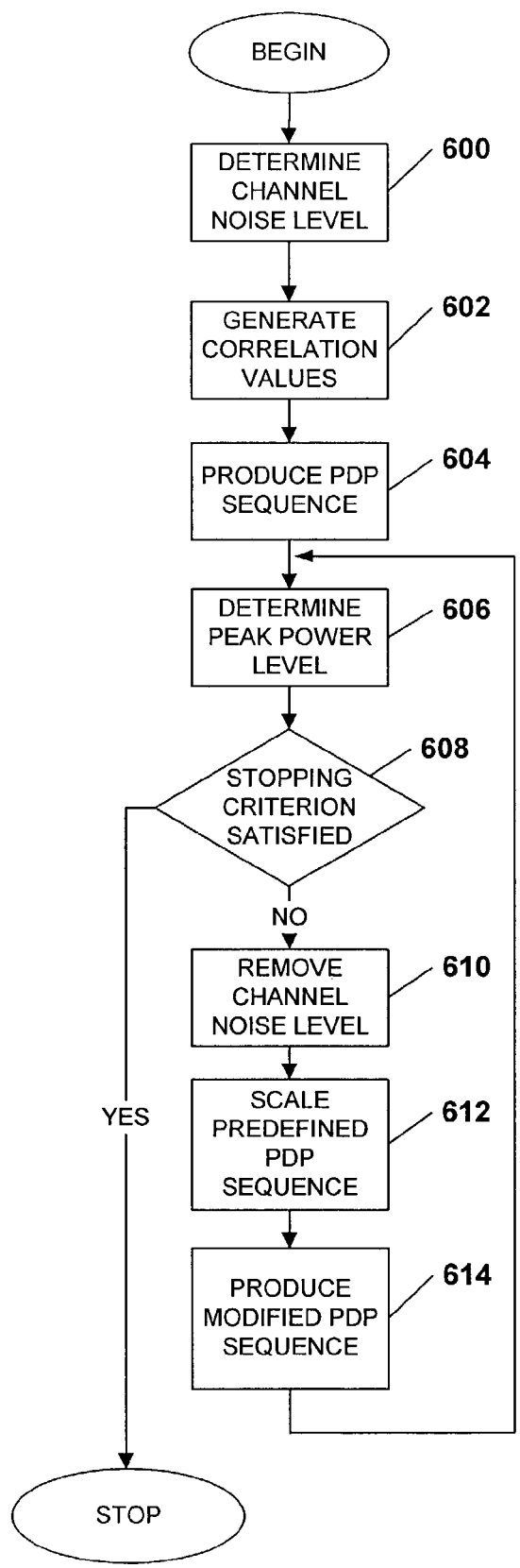
FIG. 6 illustrates operations for estimating multi-path delays according to some embodiments of the present invention.

At Block 612, a predefined PDP sequence is scaled using the modified power level value to provide a reference PDP sequence (FIG. 5b). The predefined PDP sequence may represent the PDP sequence of a received signal in a signal path channel, and may be approximated as the magnitude square of a convolution of the signal filters in a transmitter and/or a receiver. The predefined PDP sequence may be estimated based on known, approximation, or ideal responses (e.g., root-raised-cosine) of the signal filters, or a combination thereof. For example, a predefined PDP sequence may be estimated from a known receive filter response convolved with an ideal transmit filter response, an ideal receive filter response, or a combination thereof.

An example predefined PDP sequence that has a raised-cosine squared shape is provided in Table 1. The predefined PDP sequence in Table 1 assumes four samples per received information bit/chip period and includes a main-lobe and two side-lobes. It may be advantageous to use at least the values for the main-lobe and a first one of the side-lobes (e.g., 0 through +/−8 samples) to form a predefined PDP sequence.

TABLE 1

Raised-Cosine Power-Delay Profile Sequence

| Delay (Samples) | Magnitude Squared Value |
| --- | --- |
| 0 | 1 |
| +/−1 | 8.0602e−01 |
| +/−2 | 3.9626e−01 |
| +/−3 | 8.5613e−02 |
| +/−4 | 0 |
| +/−5 | 2.8113e−02 |
| +/−6 | 3.6652e−02 |
| +/−7 | 1.2484e−02 |
| +/−8 | 0 |
| +/−9 | 6.2421e−03 |
| +/−10 | 9.0090e−03 |
| +/−11 | 3.2669e−03 |
| +/−12 | 0 |

The predefined PDP sequence may alternatively be formed with two samples per bit/chip period by decimating by a factor of two the values provided in Table 1 (i.e., 0, +/−2, +/−4, . . . ). The predefined PDP sequence may be scaled at Block 612 so that its peak value is about equal to or, for example, slightly less than the modified power level value (Block 610).

Figure 5C:

At Block 614, the reference PDP sequence (Block 612) is removed from the PDP sequence (Block 604) to produce a modified PDP sequence (FIG. 5c). For example, the reference PDP sequence (Block 612) may be shifted so that it is about centered at the delay value at which the peak power level value (Block 606) occurs. The reference PDP sequence (Block 612) may then be subtracted from the PDP sequence (Block 604) to produce a modified PDP sequence. The modified PDP sequence may be stored in a memory of the receiver so as to overwrite the location where the PDP sequence (Block 604) was stored. The operations then loop back to Block 606 to determine a peak power level and delay value of the modified PDP sequence (Block 606), to test whether the stopping criterion has been satisfied (Block 608), and to selectively remove further signal images from the modified PDP sequence (Blocks 610–614).

According to other embodiments, the interrelated effects of the multi-path signals may be identified and used to improve the estimation of the peak power values and the associated delay values of the multi-path signals. For example, when a first ray is removed from a combined PDP sequence, the amplitude of the modified PDP sequence may be biased upwards due to the presence of other multi-path signals that have not yet been removed. Such bias may lead to an error in the identification of the peak values and the associated delay values for the multi-path signals. Accordingly, each multi-path signal may be removed (e.g., resubtracted) from the original PDP sequence using information about at least some of the other multi-path signals.

For example, after the delay values of two multi-path signals have been estimated, the power levels for the two signals may be re-determined using the original PDP sequence and knowledge of the pulse shape of the signals (e.g., Table 1). The re-determined power levels may then be used to remove the effects of the two signals from the original PDP sequence before a third multi-path signal is detected. In this manner, the combined effects of earlier, and subsequently, identified multi-path signals may be recursively removed to provide improved estimates of power level values and associated delay values.

One such recursive approach, may be provided by the following equation:

$$r = Ap \quad \text{(Equation 1)}$$

Vector r is the measured PDP sequences with a background noise level removed. Vector p provides the recomputed power levels. Matrix A is the predefined PDP sequence (e.g., Table 1). The elements of Matrix A correspond to the predefined PDP sequence, denoted f(k). The diagonal elements of matrix A correspond to f(0), which may be normalized to 1. The off-diagonal elements of matrix A correspond to f(d), where d is the relative delay between the multi-path signals. The power levels of the vector p may be found by solving Equation 1, such as by using an iterative technique (e.g., Gauss-Seidel or Gauss-Jordan).

For example, after the delay values of two multi-path signals have been estimated, the corresponding original PDP sequence values may be provided in vector r. Matrix A is then a 2×2 matrix of a predefined PDP sequence. For example with reference to Table 1, if the second delay value is 2 samples later than the first delay value, then matrix A would be ($A_{00}=1$, $A_{01}=0.39626$, $A_{10}=0.39626$, $A_{11}=1$). Equation 1 may be solved to determine the recomputed power levels, vector p. The recomputed power levels may then be used to obtain a more accurate estimation of the delay associated with a third multi-path signal. The three predefined multi-path signal delays may be then be used to recompute Equation 1 to determine recomputed power levels, which may be used to obtain an estimate of the delay associated with a fourth multi-path signal. This recursive process may be repeated to identify the delays associated with further multi-path signals.

Figure 7:
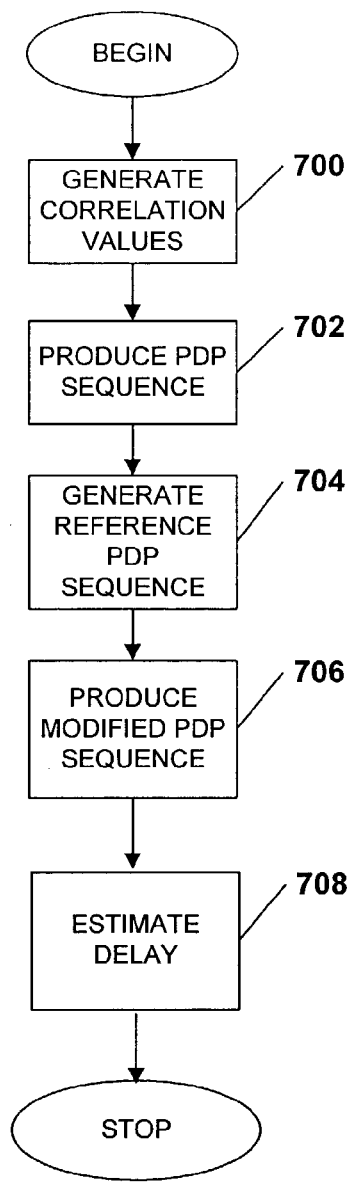
FIG. 7 illustrates operations for estimating multi-path delays according to other embodiments of the present invention.

FIG. 7 illustrates operations for estimating multi-path signal delays according to yet other embodiments of the present invention. At Block 700, correlation values are generated that correspond to a plurality of delay values in a multi-path communication signal. At Block 702, an original PDP sequence is produced from the correlation values. The original PDP sequence may include contributions that are associated with at least a first one and a second one of the plurality of delay values. At Block 704, a reference PDP sequence is generated based on a predefined PDP sequence and the original PDP sequence. The reference PDP sequence may be generated from a power level value that is determined from the original PDP sequence. The power level value may correspond to a peak power level for the original PDP sequence, which may be adjusted for a noise power level, or it may correspond to some other uniquely identifiable value in the original PDP sequence. At Block 706, the reference PDP sequence is removed from the original PDP sequence (Block 702), so as to remove at least a portion of the contributions of the original PDP sequence associated with the first one of the plurality of delay values, and to provide a modified PDP sequence. At Block 708, the second one of the delay values is estimated from the modified PDP sequence.

Accordingly, when the PDP sequence reflects the combined effects of multi-path signals, at least some of the effects of a first signal path may be removed from the PDP sequence, so that delays that are associated with other signal paths may be more accurately estimated.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of estimating a plurality of delay values in a multi-path communication signal comprising:

determining a noise level for a communication channel of the multi-path communication signal;

generating correlation values corresponding to a plurality of delay values associated with the multi-path communication signal;

producing a first power-delay profile (PDP) sequence from the correction values;

estimating a first delay value based on the first PDP sequence;

generating a first reference PDP sequence based on a predefined PDP sequence and the first PDP sequence wherein generating a first reference PDP sequence further comprises:

selecting a peak value of the first PDP sequence; and removing the noise level from the peak value before scaling a predefined PDP sequence by the peak value;

scaling a predefined PDP sequence by the peak value to generate the first reference PDP sequence;

removing the first reference PDP sequence from the first PDP sequence so as to remove at least a portion of the contributions to the first PDP sequence associated with the first delay value from the first PDP sequence, and to provide a second PDP sequence; and estimating a second delay value based on the second PDP sequence.

2. The method of claim 1, wherein generating correlation values comprises correlating the multi-path communication signal to a known CDMA spreading sequence.

3. The method of claim 1, wherein generating correlation values comprises correlating the multi-path communication signal to a known TDMA training sequence.

4. A receiver, comprising:

a correlator that is configured to generate correlation values corresponding to a plurality of delay values in a multi-path communication signal; and a delay estimator that is configured to: determine a noise level for a communication channel of the multi-path communication signal; select a peak value of the first PDP sequence; remove the noise level from the peak value before scaling a predefined PDP sequence by the peak value; scale a predefined PDP sequence by the peak value to generate the first reference PDP sequence; estimate a first delay value based on the first PDP sequence; generate a first reference PDP sequence based on a predefined PDP sequence and the first PDP sequence; remove the first reference PDP sequence from the first PDP sequence so as to remove at least a portion of the contributions to the first PDP sequence associated with the first delay value from the first PDP sequence; provide a second PDP sequence; and estimate a second delay value based on the second PDP sequence, such delay estimator producing a first power-delay profile (PDP) sequence from the correlation values.

5. The receiver of claim 4, wherein the delay estimator is further configured to correlate the multi-path communication signal to a known CDMA spreading sequence.

6. The receiver of claim 4, wherein the delay estimator is further configured to correlate the multi-path communication signal to a known TDMA training sequence.

* * * * *

UNITED STATES PATENT AND TRADEMARK OFFICE
CERTIFICATE OF CORRECTION

| | | |
|---|---|---|
| PATENT NO. | : 7,212,591 B2 | Page 1 of 1 |
| APPLICATION NO. | : 10/424958 | |
| DATED | : May 1, 2007 | |
| INVENTOR(S) | : Bottomley et al. | |

It is certified that error appears in the above-identified patent and that said Letters Patent is hereby corrected as shown below:

In Column 5, Line 62, delete "preformed" and insert -- performed --, therefor.

Signed and Sealed this

Eighth Day of April, 2008

JON W. DUDAS
*Director of the United States Patent and Trademark Office*